United States Patent [19]

Hashimoto

[11] Patent Number: 5,172,404
[45] Date of Patent: Dec. 15, 1992

[54] SYSTEM FOR COUPLING TELEPHONE ANSWERING DEVICE AND VOICE MAIL APPARATUS TOGETHER

[75] Inventor: Kazuo Hashimoto, Tokyo, Japan
[73] Assignee: Hashimoto Corporation, Tokyo, Japan
[21] Appl. No.: 589,826
[22] Filed: Sep. 26, 1990

[30] Foreign Application Priority Data

Sep. 26, 1989 [JP] Japan .................................. 1-249813

[51] Int. Cl.⁵ ......................... H04M 1/65; H04M 3/50
[52] U.S. Cl. ........................................ 379/67; 379/69;
                                          379/77; 379/84; 379/88; 379/89
[58] Field of Search ....................... 379/89, 88, 67, 69, 379/84, 77

[56] References Cited

U.S. PATENT DOCUMENTS

| | | | |
|---|---|---|---|
| 4,580,012 | 4/1986 | Matthews et al. | 379/89 |
| 4,677,657 | 6/1987 | Nagata et al. | 379/63 |
| 4,799,144 | 1/1989 | Parruck et al. | 379/88 X |
| 4,935,954 | 6/1990 | Thompson et al. | 379/89 |
| 4,941,168 | 7/1990 | Kelly, Jr. | 379/69 |
| 5,033,077 | 7/1991 | Bergeron et al. | 379/67 |

FOREIGN PATENT DOCUMENTS

0148493 8/1984 Japan ....................................... 379/69
0081953 5/1985 Japan ....................................... 379/84

*Primary Examiner*—Thomas W. Brown
*Attorney, Agent, or Firm*—Lowe, Price, LeBlanc & Becker

[57] ABSTRACT

A system combines a telephone answering device, or TAD, installed at each subscriber's premises and a voice mail center station. When IC memory is used as recording media of the TAD to record messages from a calling party, the memory becomes full to its capacity shortly, and the TAD cannot fulfill its function. To prevent this, a voice mail side is set to a message-receiving mode and an incoming message, or ICM, is transferred from the TAD side to the voice mail side by calling the voice mail side and receiving a particular signal from the TAD side. Then, the TAD restores its function and becomes capable of recording new ICMs. It was a common usage of the voice mail center that a calling party directly records ICMs in the voice mail center. In this system, however, an ICM stored in the voice mail center can be transferred to the TAD by controlling from the TAD as occasion demands, and the ICM can be stored in the TAD. This system makes possible a new combination wherein a TAD and a voice mail center, previously independent apparatuses, can control each other.

6 Claims, 6 Drawing Sheets

SYSTEM FOR COUPLING TELEPHONE ANSWERING DEVICE AND VOICE MAIL APPARATUS TOGETHER

TECHNICAL FIELD

The present invention relates to a system for coupling a telephone answering device and a voice mail apparatus together.

BACKGROUND ART

Telephone answering devices and voice mail apparatuses have heretofore been on the market independently of each other, the telephone answering devices being used as terminal equipment for individual persons and the voice mail apparatuses being used also as message transfer apparatuses in the form of large-scale telephone answering devices.

Integrated circuits have been used in current telephone answering devices resulting in an extreme reduction in the recording time, and some telephone sets have storage capacities of only several messages. Even when a tape is used, a commercially available one-hour cassette tape is not satisfactory for receiving business orders from general customers. Furthermore, though the voice mail has the capacity for storing messages as long as up to 80 hours, the user finds it difficult to determine the messages of how many months old should be erased. That is, earlier messages have been erased even if they were regarded to be necessary. Thus, these two apparatuses have their own problems.

SUMMARY OF THE INVENTION

The present invention was proposed to solve the problem of insufficient message storing capacity of the above telephone answering device as well as to solve the defect caused by the timing or lengthened time for erasing the old messages in the voice mail apparatus. The object of the invention is to provide means which quickly transfers a plurality of messages stored in the telephone answering device to the mail box side to store them in a storage unit in the mail box, such that storage means in the telephone answering device keeps enough room at all times.

The invention further provides means whereby the voice mail side can pick up important messages only from those to be erased because a predetermined period of time has passed, and quickly transfer them to the side of the telephone answering device, so that they can be filed by the individual persons at a later date.

DESCRIPTION OF THE PREFERRED EMBODIMENT

Embodiments of the invention will now be described in regard to their structures and actions.

Figure 1:
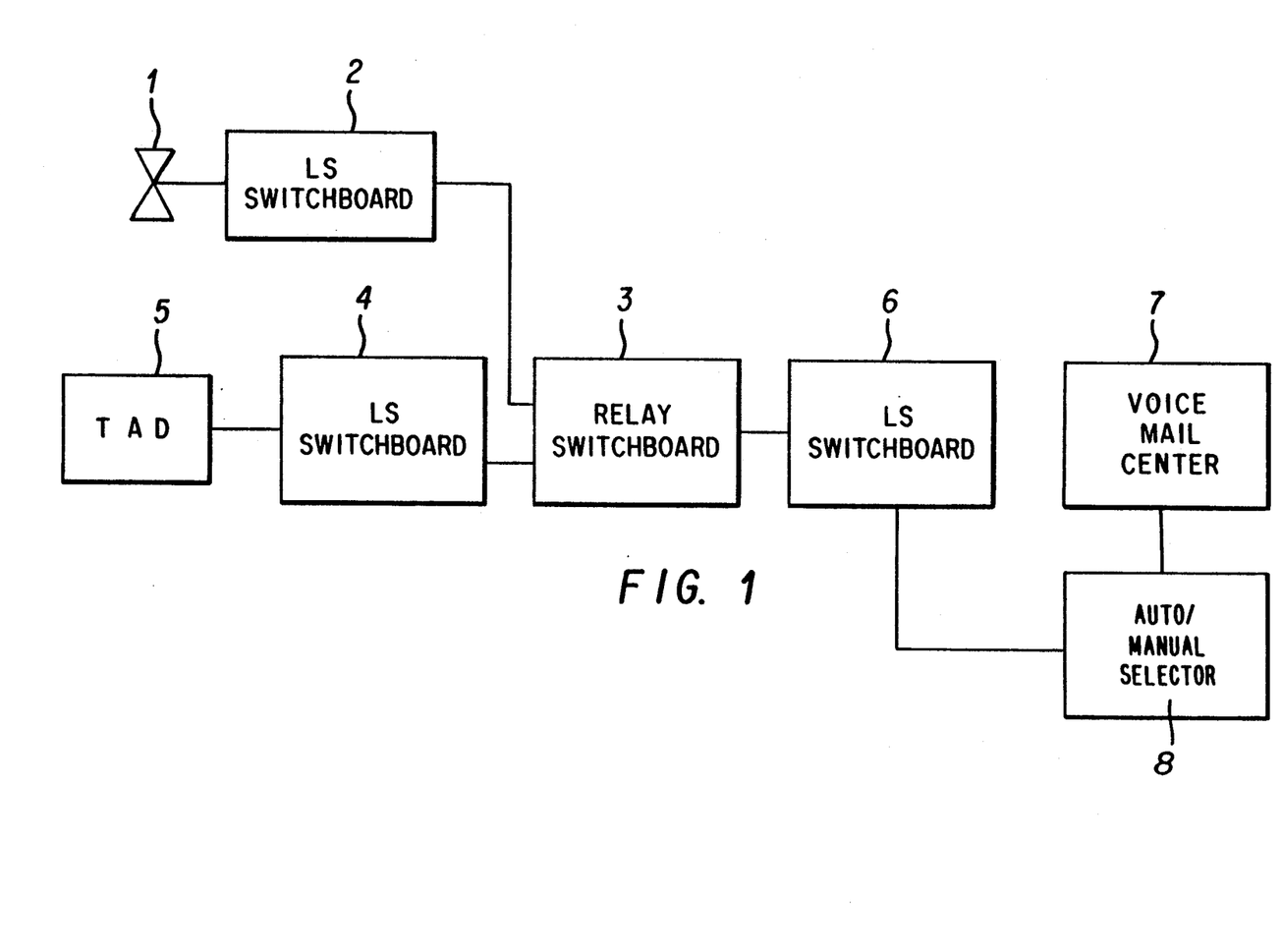
FIG. 1 is a diagram showing the connection among a telephone set, a telephone answering device (TAD), and a voice mail center.

FIG. 1 is an explanatory diagram wherein when the telephone number of a telephone answering device (TAD) 5 is dialled from a telephone set 1, the telephone answering device 5 is called via a switchboard 2, a relay switchboard 3, and a switchboard 4. Here, when the TAD detects a call signal and is engaged, a loop is formed between the TAD and the telephone set 1. First, an outgoing message that has been recorded in advance is reproduced at the TAD and is sent to a calling party at the telephone set 1. After the outgoing message is sent, the TAD is switched to the recording mode to record the message from the calling party.

Recording medium for recording the message is of solid-state memory or tape type depending upon the model of TAD. The device employing solid-state memory is capable of recording only about three messages. After the message is recorded, therefore, the voice mail center is called via the LS switchboard 4, relay switchboard 3 and LS switchboard 6, and the message recorded in the TAD is transferred to a storage device in the voice mail center 7, permitting sufficient recording not limited by the capacity of solid-state memory of TAD. An auto/manual selector 8 connected between the LS switchboard 6 and the voice mail center 7 allows the voice mail center to be called manually as well as automatically.

When tape is used as a recording medium in the TAD, on the other hand, a considerable number of messages can be recorded. Messages of calling party directly recorded in the voice mail center are transferred to the TAD and can be listened to at one time by a subscriber by manipulating the TAD in his home upon his arrival.

Figure 2:
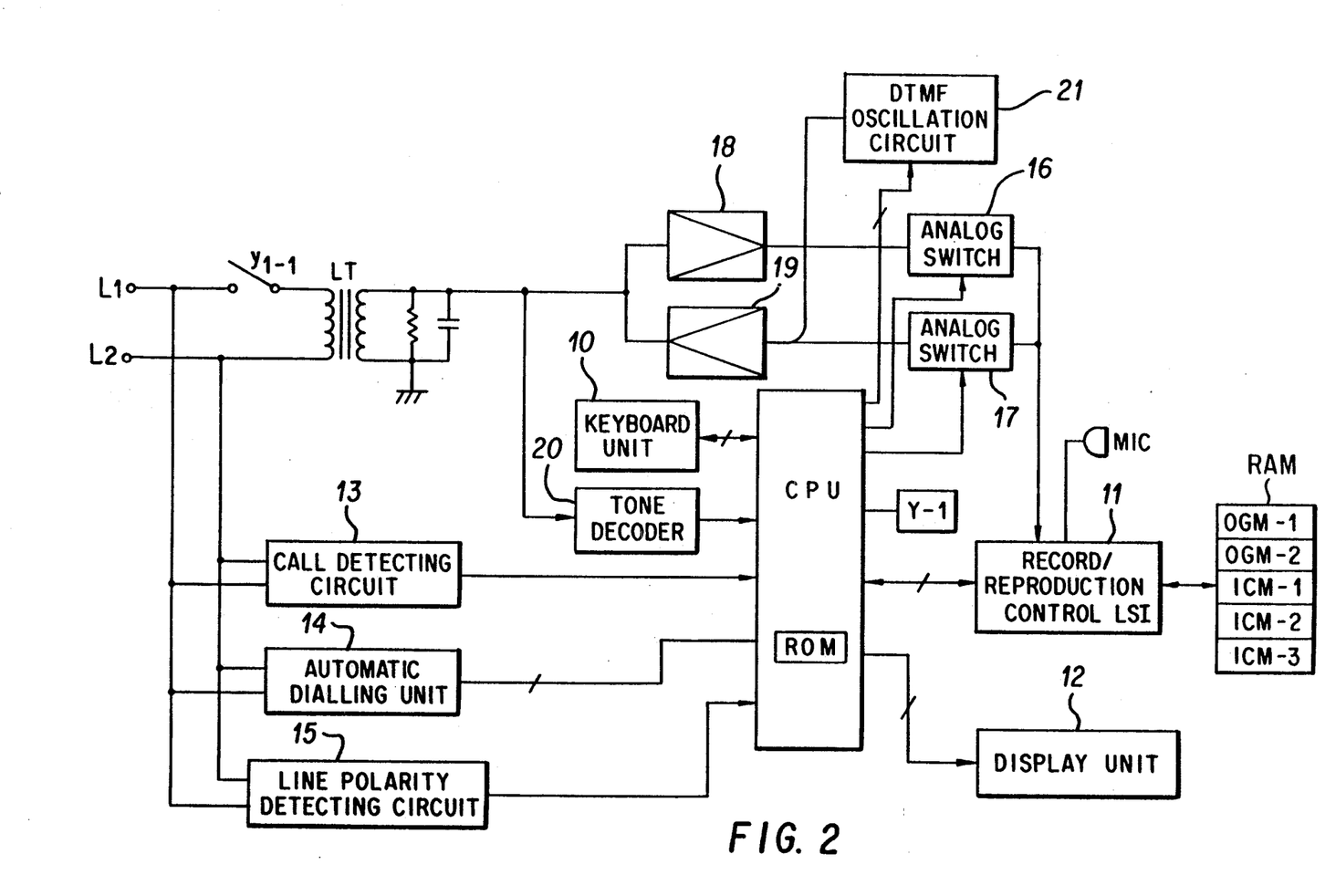
FIG. 2 is a block diagram of the telephone answering device (TAD) according to the first embodiment.
Figure 3A:
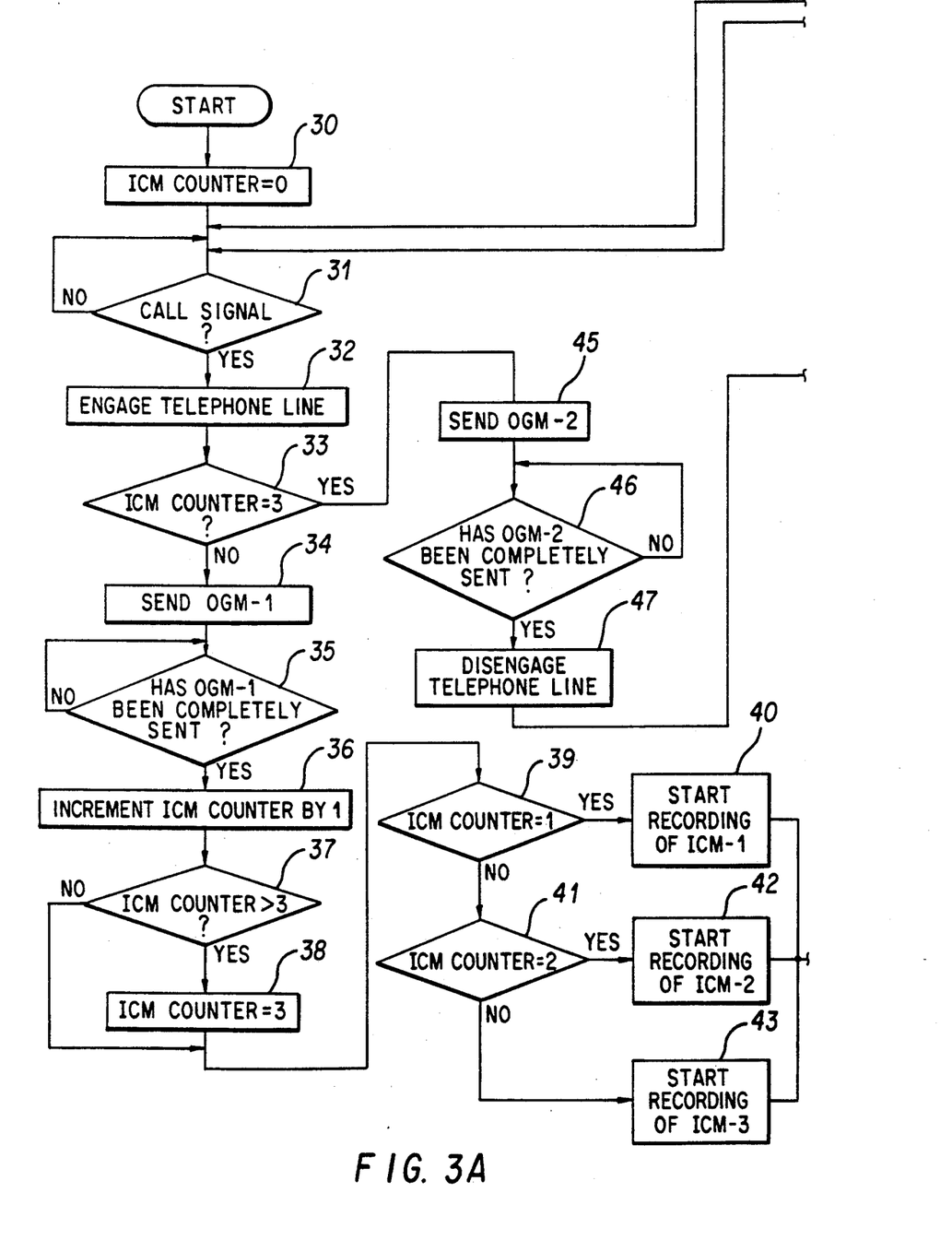
FIG. 3 is a flowchart of the first embodiment.
Figure 3B:
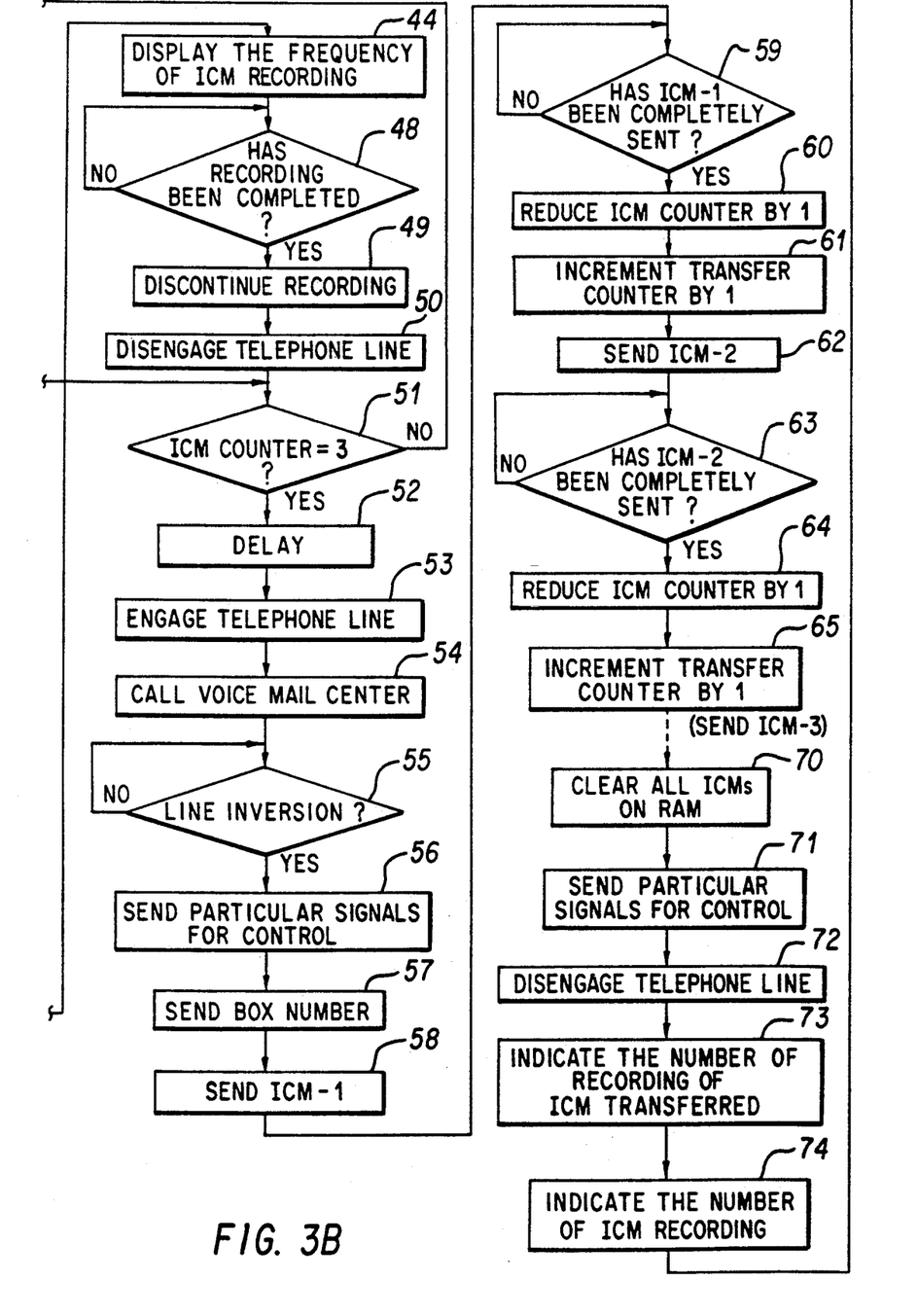

Described below in conjunction with FIGS. 2 and 3 is the case where the recording medium of TAD consists of solid-state memory, which is the first embodiment. In FIG. 2, symbols L1 and L2 denote telephone lines, LT denotes a line transformer, and CPU denotes a one-chip microprocessor which contains a mask ROM in which programs have been written. Reference numeral 10 denotes a keyboard unit having a plurality of keys for carrying out various operations, 11 denotes a record/reproduction control LSI which records and reproduces outgoing messages (OGM-1, OGM-2) and incoming messages (ICM-1 to ICM-3) from calling party on a random access memory RAM, 12 denotes a display unit which consists of liquid crystals to display telephone numbers and the like, 13 denotes a call detecting unit that detects a call signal, 14 denotes an automatic dial unit, 15 denotes a line polarity detecting circuit which detects the inversion of polarity of the line when a person makes a call and the called party responded, reference numerals 16 and 17 denote analog switches, 18 and 19 denote amplifiers, 20 denotes a tone decoder which decodes the DTMF tones of two frequencies transmitted as remote control signals, and 21 denotes a DTMF oscillation circuit of DTMF tones that are sent as remote control signals.

The present apparatus is constituted by the aforementioned components, and operations will now be described with reference to flowchart of FIG. 3. First, in the RAM have been recorded in advance a first outgoing message OGM-1 for prompting the calling party to record his message, and a second response-only message OGM-2 that will be sent when the RAM becomes full and the incoming message from the calling party can no longer be recorded. The automatic answering KEY (not shown) of the keyboard unit 10 is depressed to set the apparatus to the automatic answering/recording mode. Here, an ICM counter (which is the register contained in the CPU) which stores how many messages have been recorded is cleared to zero at step 30 of the program stored in the ROM. A stand-by mode is established at the next step 31 to wait for an incoming call signal. A call signal from a third party is detected by the call detecting circuit 13 and passed to the CPU. When the signal is determined to be a call signal at step 31, the next step 32 turns on a relay Y-1 that is the load of the CPU, whereby a contact Y1-1 of the relay Y-1 engages the telephone line via the primary winding of the line transformer LT.

Step 33 examines whether the above ICM counter is incremented to "3" or not. According to this embodiment, it is allowed to record messages (ICM) by calling party of three calls only, and the ICM counter at this moment is incremented to "3". Because the ICM counter here remains "0", the step 33 is negative and the program proceeds to step 34. Here, the first outgoing message OGM-1 recorded in the RAM as digital signals is converted into analog signals through the record/reproduction control LSI 11 in response to command from the CPU, and the signals are sent to the calling party through the analog switch 17, amplifier 19 and line transformer LT. Detection of completion of the OGM-1 at step 35 is stored in the record/reproduction control LST with the position of completion thereof as an address, and is sent to the CPU as a digital signal when sending the OGM-1 is completed. At the next step 36, the ICM counter is incremented to +1. When a call is received for the first time, the content of the ICM counter becomes "1". The next step 37 examines whether the value of the ICM counter is greater than "3" or not. When the call is received for the first time, this is negative as is obvious from the above but becomes affirmative at step 39. At step 40, therefore, the incoming message ICM-1 of the first calling party is recorded on the RAM. That is, the incoming message of the calling party is recorded on the RAM via the line transformer LT, amplifier 18, analog switch 16, and record/reproduction control LSI 11 which is switched to the recording mode. At step 44, furthermore, the number of records of the ICM is displayed on the display unit 12. Step 48 examines whether the recording of incoming message of the calling party at that time has been completed or not. In the record/reproduction control LSI 11 are stored the end positions of messages as address data which are then read by the CPU, so that the step 48 becomes affirmative. Then, the recording is discontinued (step 49) and the telephone line is disengaged (step 50). The next step 51 examines whether three calls of message by the aforementioned operation have been recorded. When three calls of messages are recorded, the program proceeds to step 52 and onwards to call the voice mail center so that three calls of messages by calling party are transferred to the voice mail center. However, when the message of the first calling party only is recorded as described above, the step 51 is negative and the stand-by mode is restored to wait for a call signal at step 31.

The aforementioned operation is repeated and when three messages ICM-1, ICM-2 and ICM-3 by calling party are recorded in the RAM, the above-mentioned step 51 becomes affirmative. After delay of several seconds (step 52), the automatic dialling unit 14 is started to engage the telephone line (step 53). Dial signals of a type (pulse type or DTMF tone type) adapted to the telephone line are sent from the automatic dialling unit 14 or manually to call the voice mail center (step 54). When the voice mail center responds, polarity of the telephone line is inverted which is then detected (step 55) via the line polarity inversion detecting circuit 15. Here, by using a DTMF oscillation circuit 21, tones "A" and "B" (commercially available DTMF IC is capable of generating tones A, B, C and D in addition to tones 0 to 9, #, and *) are successively produced as particular signals for control (step 56). The voice mail center is so constructed (not shown) that when the particular signals are detected, guidances that need not be heard are prevented from being sent since no person is attending there. Then step 57 sends a contracted box number. When particular signals for control at the step 56 are detected by the voice mail center, reception of DTMF tones 0 to 9, #, and * is inhibited (not shown) after the box number at the step 57 is received. This is because if these tones are recorded in the recorded messages sent from the TAD, the voice mail center may erroneously recognize them as particular signals for control. General telephone sets do not have buttons for the tones "A" to "D". Therefore, these tones are never recorded in the messages.

At the next step 58, the message ICM-1 by the calling party recorded in the RAM is sent in response to command from the CPU. Transmission of the message ICM-1 may be executed after a confirmation signal is received from the voice mail center that has received the box number. When it is detected at step 59 that sending the message ICM-1 is completed in response to the address data, step 60 decrements the ICM counter by 1. Further, the transfer counter is incremented by 1 (step 61). At steps 62 to 65, furthermore, the message ICM-2 by the calling party is transferred like ICM-1. Though the message ICM-3 is not diagrammed, the messages of these three calls are transferred. After the messages of three calls recorded on the RAM are all cleared at step 70, particular signals for control such as DTMF tones "A" and "C" are sent (step 71) to inform the voice mail center of the fact that sending the messages of the calling party is completed. Upon receipt of this signal, the voice mail center stops the recording operation and disengages the telephone line (not shown). On the TAD side, too, the telephone line is disengaged at step 72, the number of records of the transferred messages (3 in this case) and the number of records of the messages on the RAM (0 in this case) are displayed on the display unit 12, and the stand-by mode of the step 31 is restored. Therefore, the subscriber who gets home is allowed to learn the number of incoming messages from the calling party recorded in the TAD and the number of messages transferred to the voice mail center, and is allowed to hear the messages transferred to the voice mail center through a predetermined remote control operation, as required.

On the other hand, when a call is received during the delay operation of a few seconds at the step 52, the program returns to the step 31 due to the interrupt operation. When this call signal is detected, the telephone line is engaged (step 32) as described above and the program proceeds to the step 33 where the decision is affirmative. After the response-only message OGM-2 is sent, the engagement is released (steps 45, 46, 47), the program returns to the step 52 where the interrupt has developed, and the operation is started to transfer the message of the calling party that has been recorded to the voice mail center.

In the foregoing description of operation, messages are transferred to the voice mail center when the RAM is full of the messages of the calling party. However, the message of the calling party may be transferred every time a message of one call is recorded. This can be done by simply changing "3" to "1" at step 51. Furthermore, the recording medium is not limited to the RAM but may be a recording tape.

Figure 4:
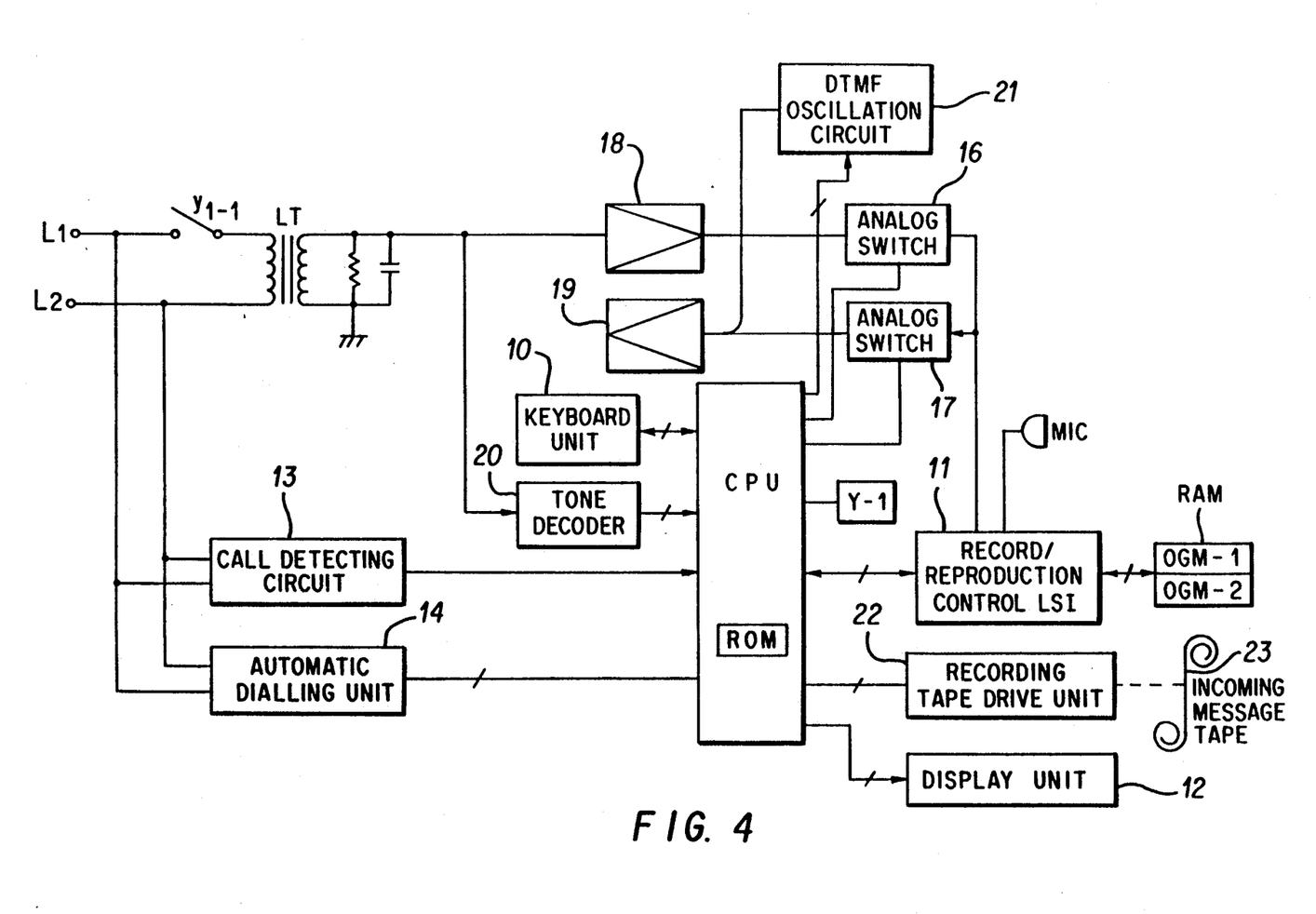
FIG. 4 is a block diagram of the telephone answering device (TAD) according to the second embodiment; and, FIG. 5 is a flowchart of the second embodiment.

Described below is the operation for transferring the messages of calling party directly received by the voice mail center to the recording tape in the TAD which is capable of recording for extended period of time according to the second embodiment. FIG. 4 is a block diagram which illustrates the second embodiment. What makes this embodiment different from the first embodiment of FIG. 2 is that the RAM of memory is capable of recording the outgoing messages OGM-1 and OGM-2 only, and the incoming messages sent from the calling party directly to the TAD and the incoming messages of the calling party sent from the voice mail center are recorded on an incoming message tape 23 which is capable of recording for extended periods of time.

Reference numeral 22 denotes a recording tape drive unit. The circuit for recording/reproducing the receiving tape 23 has been widely known and is not described here. Further, portions common to those of FIG. 2 are not described here in detail.

Figure 5:
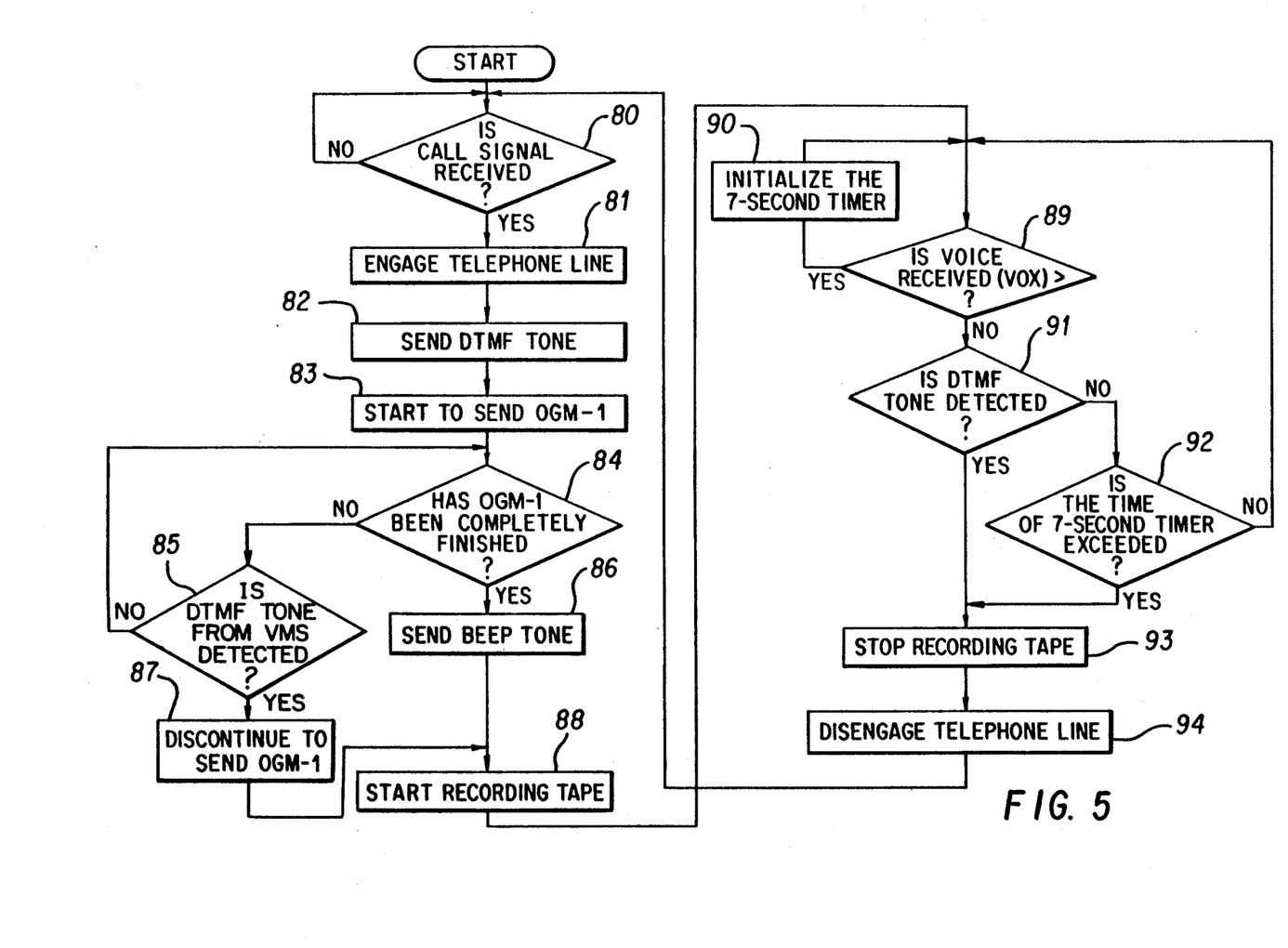

In FIG. 5, when the call signal is detected via the call detecting circuit 13 (step 80), the relay Y-1 is turned on and the telephone line is engaged by the contact Y1-1 thereof (step 81). Simultaneously with the engagement, the DTMF oscillation circuit 21 produces a DTMF tone such as tone "B" for about 0.5 second to inform the voice mail center of the identification of the TAD. Thereafter, sending the outgoing message OGM-1 is started (step 83). Steps 84 and 85 form a loop until sending the OGM-1 is finished, and the step 85 detects the DTMF tone that is sent from the voice mail center.

For instance, when the DTMF tones "B" and "A" are detected, the step 85 becomes affirmative. At the next step 87, sending the outgoing message is discontinued to shorten the access time. Then, at step 88, the incoming message tape (recording tape) 23 is started in the recording mode via the recording tape drive unit 22. When the calling party is an unspecified customer, the DTMF tone is not detected at the step 85. Therefore, after the outgoing message OGM-1 is completely sent, the step 84 becomes affirmative, a step 86 produces a beep tone and switching to the recording mode is made at step 88. Steps 89, 90 and 92 represent VOX operation. That is, when a voice is detected at the step 89, the step 90 initializes the timer for seven seconds. The recording tape is stopped at step 93 when the time of the 7-second timer is exceeded at step 92 via the step 91 under the condition where the voice is not detected at the step 89 (by the on-hook of the calling party who has directly called TAD) or when the DTMF tone such as tone "B", the message sending completion signal from the voice mail center, is detected at the step 91. The recording mode is then discontinued, the connection of the telephone line is discontinued, and the stand-by condition at the step 80 is restored. The voice mail center is restored, too, after having sent the message sending completion signal.

When the incoming message tape 23 (recording tape) becomes full of messages though it is not diagramed, a particular signal is sent to the voice mail center to stop the transfer of message. When a call is received, thereafter, the TAD sends the response-only message OGM-2.

In both the first and second embodiments, the tone decoder 20 is contained enabling the messages of the calling party recorded in the RAM or the incoming message tape to be listened to by the subscriber who is out through the remote control operation.

The voice mail center has a DTMF tone generating circuit to send particular signals to the TAD for calling the subscriber. Further, the technique for transferring the messages of the calling party to the TAD can be realized by slightly modifying the existing technique which enables the subscriber to listen to the message directed to him by calling the voice mail center. Therefore, the voice mail side is not detailed in this application.

According to the present invention as described above, the telephone answering device and the voice mail apparatus are combined together as a system while complementing the defects possessed by each other. Thus, the system exhibits great practical effects as a terminal data storage unit for personal use.

I claim:

1. A system for combining a telephone answering device and a voice mail apparatus together, including means for detecting that a voice mail side being called by a telephone answering device (hereinafter referred to as TAD) is engaged, and wherein after the calling is detected the voice mail side is set to a message-receiving mode in response to a particular signal generated from a TAD side, further including means for sending a message stored in the TAD to the voice mail side.

2. A system for combining a telephone answering device and a voice mail apparatus together as set forth in claim 1, wherein the voice mail side includes means for enabling the voice mail apparatus to be called from the TAD side by manual as well as automatic operation.

3. A system for combining a telephone answering device and a voice mail apparatus together as set forth in claim 1, wherein a particular signal for control between the TAD and the voice mail apparatus consists of a DTMF tone or a combination of DTMF tones.

4. A telephone system, comprising:
   a telephone answering device (TAD) having means for storing at least one incoming message;
   a voice mail apparatus;
   means for controlling said TAD to call said voice mail apparatus and transmit a first predetermined signal over a telephone line in response to a first predetermined condition;
   means for detecting that a voice mail end of said telephone line is engaged in response to a call by said TAD and for setting said voice mail apparatus to a message-receiving mode in response to said first predetermined signal, and
   means for transmitting a message stored in said storing means of said TAD to said voice mail apparatus.

5. The telephone system of claim 4, further comprising:
   means for receiving a second predetermined signal from said voice mail apparatus;
   means for setting said TAD in an incoming message receiving mode in response to said second predetermined signal received from said voice mail apparatus; and
   means for storing a message incoming from said voice mail apparatus in said storing means of said TAD.

6. A method of processing messages on a telephone network including a telephone answering device (TAD) and a voice mail apparatus connected to a telephone line, comprising the steps of:

controlling said TAD to call said voice mail apparatus when said TAD has stored an incoming message satisfying a predetermined condition, and when a voice mail end of said telephone line has engaged, sending a first predetermined signal to said voice mail apparatus; and controlling said voice mail apparatus to operate in a message receiving mode in response to said first predetermined signal and sending at least one message from said TAD to said voice mail apparatus for storage therein.

* * * * *